(12) United States Patent
Kang et al.

(10) Patent No.: US 11,286,020 B2
(45) Date of Patent: Mar. 29, 2022

(54) BALLAST WATER-FREE VESSEL USING DIFFERENCE IN DEPTH OF BOTTOM SHELL PLATE BETWEEN BOW/STERN AND MIDSHIP SECTION AND CONSTRUCTION METHOD THEREOF

(71) Applicant: Korea Institute of Ocean Science & Technology, Ansan (KR)

(72) Inventors: Hee Jin Kang, Gyeryong (KR); Jin Choi, Gyeryong (KR); Hae Seong Ahn, Daejeon (KR); Kwang Soo Kim, Daejeon (KR); Geun Tae Yim, Daejeon (KR); Myoung Soo Kim, Daejeon (KR)

(73) Assignee: Korea Institute of Ocean Science & Technology, Ansan (KR)

( * ) Notice: Subject to any disclaimer, the term of this patent is extended or adjusted under 35 U.S.C. 154(b) by 552 days.

(21) Appl. No.: 16/307,117

(22) PCT Filed: Mar. 28, 2018

(86) PCT No.: PCT/KR2018/003680
§ 371 (c)(1),
(2) Date: Dec. 4, 2018

(87) PCT Pub. No.: WO2019/022338
PCT Pub. Date: Jan. 31, 2019

(65) Prior Publication Data
US 2021/0221471 A1    Jul. 22, 2021

(30) Foreign Application Priority Data
Jul. 25, 2017  (KR) ........................ 10-2017-0094441

(51) Int. Cl.
*B63B 1/32* (2006.01)
*B63B 73/10* (2020.01)
(Continued)

(52) U.S. Cl.
CPC .................. *B63B 1/32* (2013.01); *B63B 3/16* (2013.01); *B63B 3/38* (2013.01); *B63B 13/00* (2013.01);
(Continued)

(58) Field of Classification Search
CPC .... B63B 3/00; B63B 3/14; B63B 3/16; B63B 3/38; B63B 2003/385; B63B 39/02;
(Continued)

(56) References Cited

U.S. PATENT DOCUMENTS 1,295,211 A * 2/1919 Yamasaki et al. ...... F16N 13/22
184/35
2,347,077 A * 4/1944 Burgess .................... B63B 1/04
114/61.3
(Continued)

FOREIGN PATENT DOCUMENTS

KR    20050062758 A  *  6/2005
KR    20120122088 A  *  11/2012
(Continued)

*Primary Examiner* — Daniel V Venne (57) ABSTRACT

A ballast water-free ship using a difference in the depth of the bottom shell plate between the bow/stern and the midship section and a construction method thereof. A stepped portion is formed between either the bow or the stern and the midship section, such that the depth of the bottom shell plate of either the bow or the stern differs from the depth of the bottom shell plate of the cargo containment in the midship section, so that cargo can be loaded and unloaded without ballast water operation.

3 Claims, 9 Drawing Sheets

(51) Int. Cl.
  *B63B 73/20*   (2020.01)
  *B63B 3/16*    (2006.01)
  *B63B 3/38*    (2006.01)
  *B63B 13/00*   (2006.01)
  *B63B 39/03*   (2006.01)
  *B63B 39/06*   (2006.01)
  *B63B 11/00*   (2006.01)

(52) U.S. Cl.
  CPC .............. *B63B 39/03* (2013.01); *B63B 39/06* (2013.01); *B63B 73/10* (2020.01); *B63B 73/20* (2020.01); *B63B 11/00* (2013.01); *B63B 2003/385* (2013.01); *B63B 2039/067* (2013.01)

(58) Field of Classification Search
  CPC ... B63B 39/03; B63B 39/06; B63B 2039/067; B63B 11/00; B63B 13/00
  USPC .................................................. 114/121–126
  See application file for complete search history.

(56) References Cited

U.S. PATENT DOCUMENTS 9,238,501 B1 *  1/2016  Shen .......................... B63B 3/38
9,359,048 B2 *  6/2016  Keuning ................... B63B 3/44

FOREIGN PATENT DOCUMENTS

KR    20140046878 A  *  4/2014
KR    20140144555 A  *  12/2014

* cited by examiner

Side Elevation

Front Elevation

Fig. 8

BALLAST WATER-FREE VESSEL USING DIFFERENCE IN DEPTH OF BOTTOM SHELL PLATE BETWEEN BOW/STERN AND MIDSHIP SECTION AND CONSTRUCTION METHOD THEREOF

CROSS-REFERENCE TO RELATED APPLICATIONS

This application is a U.S. National Stage of International Patent Application No. PCT/KR2018/003680, filed on Mar. 28, 2018, which claims the priority benefit of Korean Patent Application No. 10-2017-0094441, filed on Jul. 25, 2017 in the Korean Intellectual Property Office, the disclosures of which are incorporated herein by reference in their entireties.

TECHNICAL FIELD

The present invention relates to a ballast water-free ship using a difference in the depth of the bottom shell plate between the bow/stern and the midship section and a construction method thereof. More particularly, the present invention relates to a ballast water-free ship using a difference in the depth of the bottom shell plate between the bow/stern and the midship section and a construction method thereof, in which a stepped portion is formed between either the bow or the stern and the midship section, such that the depth of the bottom shell plate of either the bow or the stern differs from the depth of the bottom shell plate of the cargo containment in the midship section, so that cargo can be loaded and unloaded without ballast water operation.

BACKGROUND ART

In general, ballast water in a ship may serve to, for example, maintain stability of the ship, perform trim and heel control over the hull, secure immersion depth of the propeller, reduce bow slamming by obtaining a proper draft, reduce a continuous bending moment of the ship during voyage, and relieve shearing force of the ship.

To develop a ballast water-free ship, a function capable of substituting for the functions of ballast water as described above must be provided while ballast water is not used.

The amount of ballast water used in a ship ranges generally from 30% to 40% of dead weight (DWT), although the amount of ballast water varies depending on the type of the ship. It is known that the amount of ballast water used in a passenger ship is about 10% greater than the amount of ballast water used in a cargo ship, such as a container carrier or a bulk carrier.

Although a variety of design considerations for realizing a ballast water-free ship has currently been proposed, no commercialization has been realized. This is because the ballast water-free ship is significantly disadvantageous to conventional ballast water ships, due to the following requirements: (1) maintenance of posture control performance in response to cargo loading, (2) a proper depth to which the propeller is immersed, (3) an appropriate level of resistance propulsion performance, (4) a countermeasure to bow slamming during voyage, (5) a countermeasure to load that the bull supports during voyage, (6) operability in conventional ports, (7) easy technical implementation, and (8) life cycle economic efficiency.

Accordingly, the inventors have invented a ballast water-free ship using a difference in the depth of the bottom shell plate between the bow/stern and the midship section and a construction method thereof, which can obtain the above-described advantageous requirements (1) to (8) while removing ballast water operation by forming a stepped portion between either the bow or the stern and the midship section, such that the depth of the bottom shell plate in either the bow or the stern and the midship section differs from the depth of the bottom shell plate in the midship section, so that cargo can be loaded and unloaded without ballast water operation.

DISCLOSURE

Technical Problem

Accordingly, the present invention has been made keeping in mind the above problems occurring in the prior art, and an object of the present invention is to provide a ballast water-free ship using a difference in the depth of the bottom shell plate between the bow/stern and the midship section and a construction method thereof, in which a stepped portion is formed between either the bow or the stern and the midship section, such that the depth of the bottom shell plate of either the bow or the stern differs from the depth of the bottom shell plate of the cargo containment in the midship section, so that cargo can be loaded and unloaded without ballast water operation.

Technical Solution

According to an embodiment of the present invention, a ballast water-free ship may include: a bow and a stern protruding downward to form a stepped portion in a bottom shell plate of a ship, between either the bow or the stern and a midship section; and a bilge keel provided on a bottom of the bottom shell plate in the midship section to be located in a longitudinal direction of the bottom shell plate. The stepped portion formed on the bottom shell plate, between either the bow or the stern and the midship section, causes a difference in height between a draft of the midship section and a draft of either the bow or the stern, such that posture control of the ship in a body of water is enabled in a ballast water-free condition, using a difference in depth of the bottom shell plate between either the bow or the stern and the midship section.

According to an embodiment, the ballast water-free ship may include one or more fin stabilizers arranged on the bottom of the bottom shell plate in the midship section to be located in the longitudinal direction of the bottom shell plate.

According to an embodiment, the bow may be located below a bulb of the ship, the stern may be located below an engine room of the ship, and the bottom shell plate in the midship section may be located below a cargo containment of the ship.

According to an embodiment, a bottom surface of the cargo containment located in the midship section of the ship may have an inclination in a direction of the stern.

According to an embodiment, a hull bilge radius of the bottom shell plate may be formed at an angle corresponding to 90°.

According to an embodiment, clean water including drinking water or extinguishing water used in the ship may be used as ballast water during cargo loading or unloading.

According to an embodiment of the present invention, a method of constructing a ballast water-free ship may include: providing a bow and a stern to protrude downward to form a stepped portion in a bottom shell plate of a ship, between either the bow or the stern and a midship section; and providing a bilge keel on a bottom of the bottom shell plate in the midship section to be located in a longitudinal direction of the bottom shell plate.

According to an embodiment, the method may include arranging one or more fin stabilizers on the bottom of the bottom shell plate in the midship section to be located in the longitudinal direction of the bottom shell plate.

According to an embodiment, the method may further include forming a bottom surface of the cargo containment, located in the midship section of the ship, to have an inclination in a direction of the stern.

According to an embodiment, the method may further include forming a hull bilge radius of the bottom shell plate at an angle 90°.

Advantageous Effects

According to an aspect of the present invention, in the ballast water-free ship, the height of the bottom of either the bow or the stern is formed different from the height of the bottom of the cargo containment, such that a proper depth to which the propeller is immersed can be obtained. In particular, since the draft of the cargo containment is lower than the draft of either the bow or the stern, the further reduced wetted surface area can advantageously minimize an increase in resistance regardless of the stepped portion between either the bow or the stern and the cargo containment.

In addition, according to another aspect of the present invention, since the draft of the cargo containment is lower than the draft of either the bow or the stern, an appropriate level of resistance propulsion can be obtained and the bulb of the bow can be more deeply immersed due to the lower draft than that of the cargo containment. This configuration can advantageously obtain a countermeasure to bow slamming during voyage of the ballast water-free ship.

Furthermore, according to an aspect of the present invention, a reinforcement structure, such as a bilge keel or fin stabilizers, may be added to the bottom of the cargo containment located in the midship section of the ballast water-free ship, within the range of the baseline of the bow and the stern. This configuration can advantageously obtain a countermeasure to load that the hull supports during voyage.

In addition, according to an aspect of the present invention, the vertical degree of the topside of the ship can be maintained without operation of additional external attachments, equipment, and instruments, such that operability in conventional ports can advantageously be obtained.

Furthermore, according to an aspect of the present invention, clean water, such as drinking water or extinguishing water, used in the ship, may be limitedly used as ballast water to control a longitudinal incline or a lateral incline during anchoring on a port or cargo loading or unloading. It is therefore possible to maintain posture control performance in the case of cargo loading.

In addition, according to an aspect of the present invention, a ship model that can be constructed using docks or construction equipment of conventional shipyards is provided. Since the necessity of addition or operation of additional equipment and facilities is removed, unlike from the concept of conventional non-ballast water ships, easy technical implementation can advantageously be obtained.

Furthermore, according to an aspect of the present invention, the degrees of difficulty of design and construction are lower than the degrees of difficulty of design and construction of conventional ships. In the case of shipbuilding, the use of steel for a ballast water operation system and a corresponding section is reduced. It is therefore possible to advantageously reduce ship construction costs, compared to conventional ballast water ships.

In particular, in the aspect of resistance performance, there is no difference in fuel consumption compared to conventional ballast water ships. Since strengthened ballast water certification applied to conventional ballast water ships is not required, a length of time, e.g. several days, in which a ship must stand by at a port for ballast water certification can be reduced. This can advantageously improve the ship operating rate, realizing life cycle economic efficiency.

In addition, according to an aspect of the present invention, since no ballast water is discharged from ships, the problem of marine ecosystem disturbance involved in long-distance movement of marine microorganisms due to ballast water operation in ships can advantageously be overcome.

DESCRIPTION OF THE REFERENCE NUMERALS IN THE DRAWINGS

1: ballast water ship
100: ballast water-free ship using a difference in the depth of the bottom shell plate between the bow/stern and the midship section
110: bow
120: stern
130: cargo containment
140: bilge keel
150: fin stabilizer

MODE FOR INVENTION

Hereinafter, reference will be made to exemplary embodiments for a better understanding of the present invention. The embodiments set forth hereinafter are provided for illustrative purposes to fully convey the concept of the present invention but should not be construed as being limitative of the disclosure of the present invention.

Figure 1:
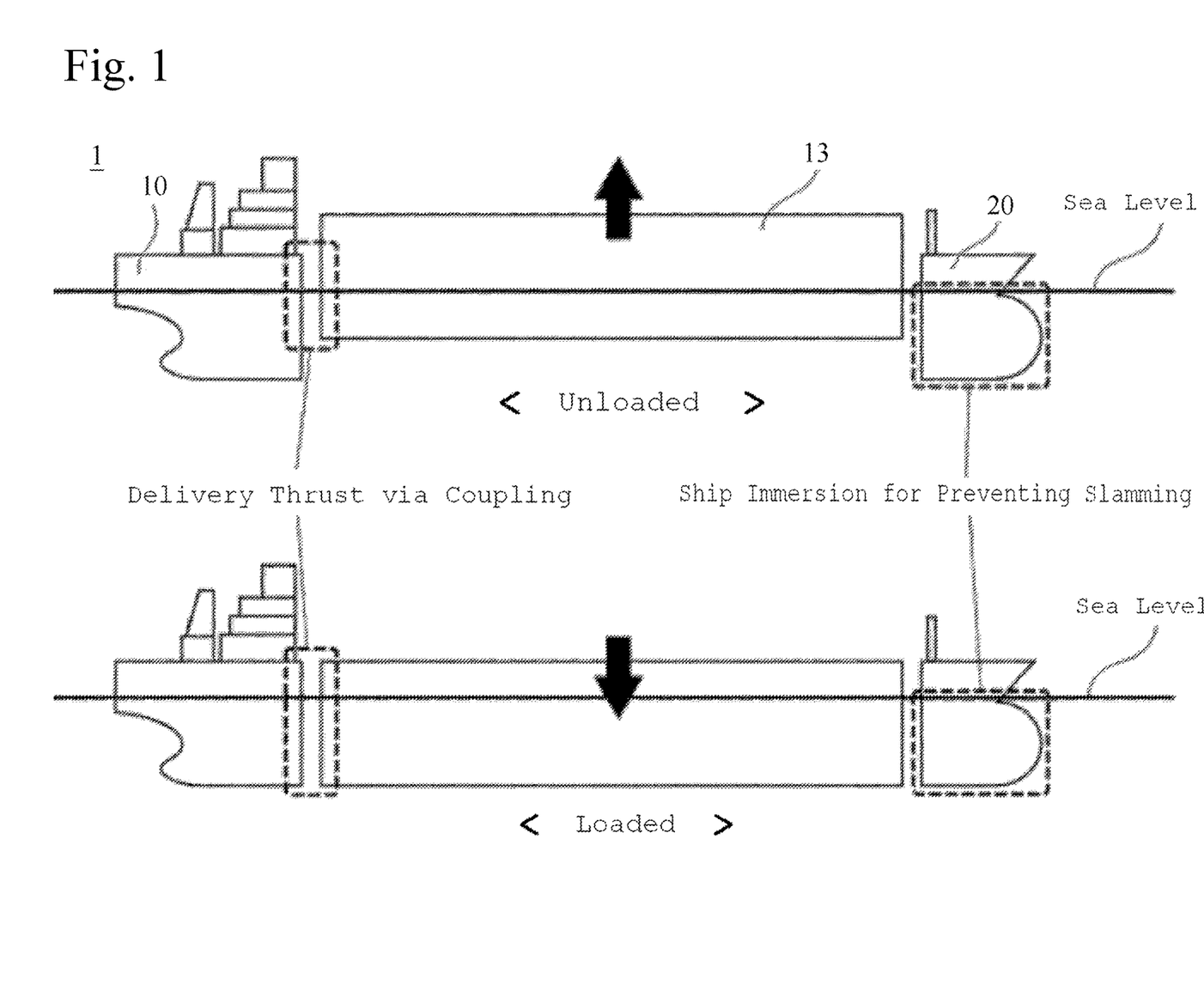
FIG. 1 is a schematic view illustrating a technology of changing a draft in a cargo containment while maintaining a draft in the bow and the stern in a ballast water ship 1 of the related art.

FIG. 1 is a schematic view illustrating a technology of changing a draft in a cargo containment 13 while maintaining a draft in the bow 10 and the stern 20 in a ballast water ship 1 of the related art.

Referring to FIG. 1, FIG. 1 illustrates a concept of changing the draft in the cargo containment 13 located in the midship section of the ship, depending on cargo loading and unloading situations, while maintaining the draft in the bow 10 and the stern 20, in the ballast water ship 1 of the related art.

In this case, the bow 10, the stern 20, and the cargo containment 13 are connected using a device capable to adjusting the draft of the bow 10, the stern 20, and the cargo containment 13. The adjustment of the draft of the cargo containment 13 may be associated with bending, shearing load, and equipment operation during marine navigation, thereby causing difficulties involved in equipment operation, which are problematic.

Figure 2:
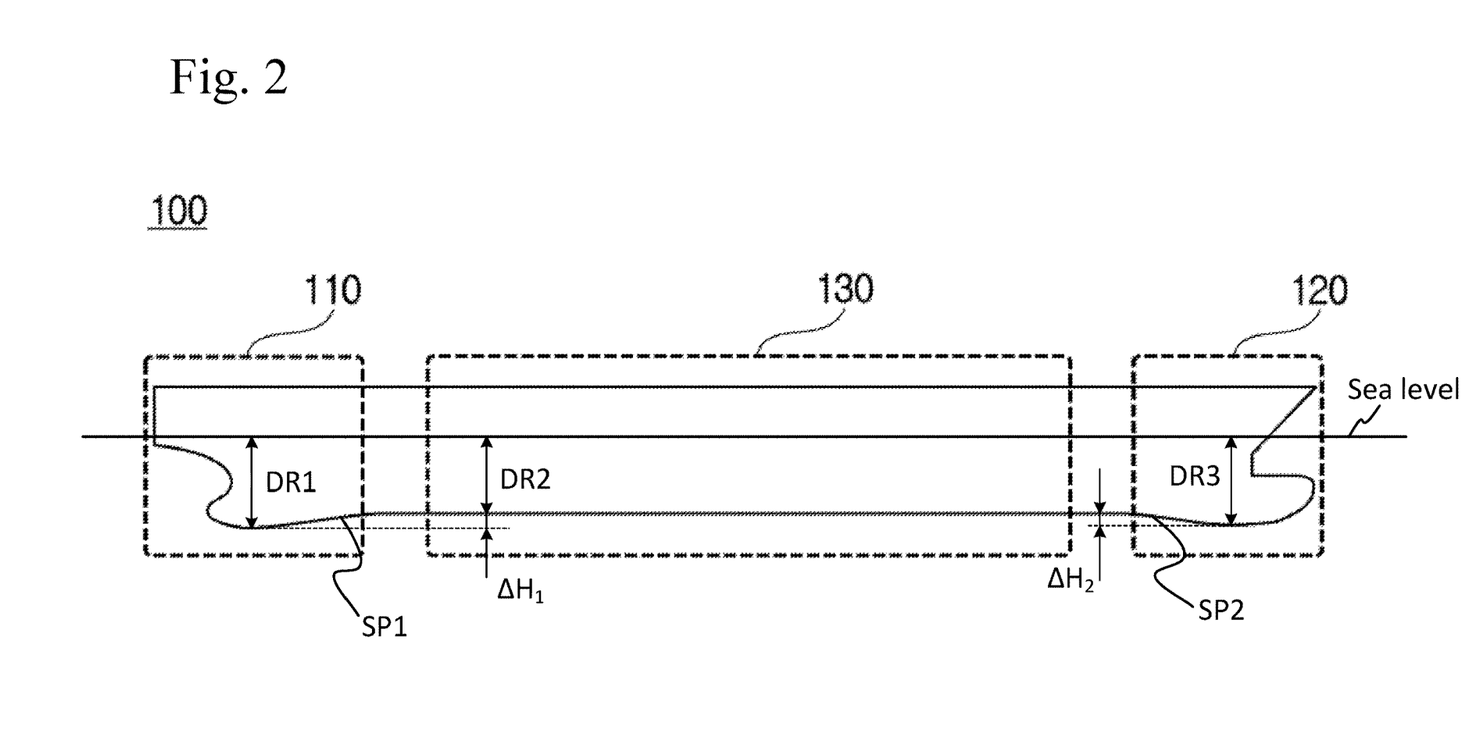
FIG. 2 is a schematic view illustrating a bottom shell plate of a ballast water-free ship 100 using a difference in the depth of the bottom shell plate between the bow/stern and the midship section according to an embodiment of the present invention.
Figure 3:
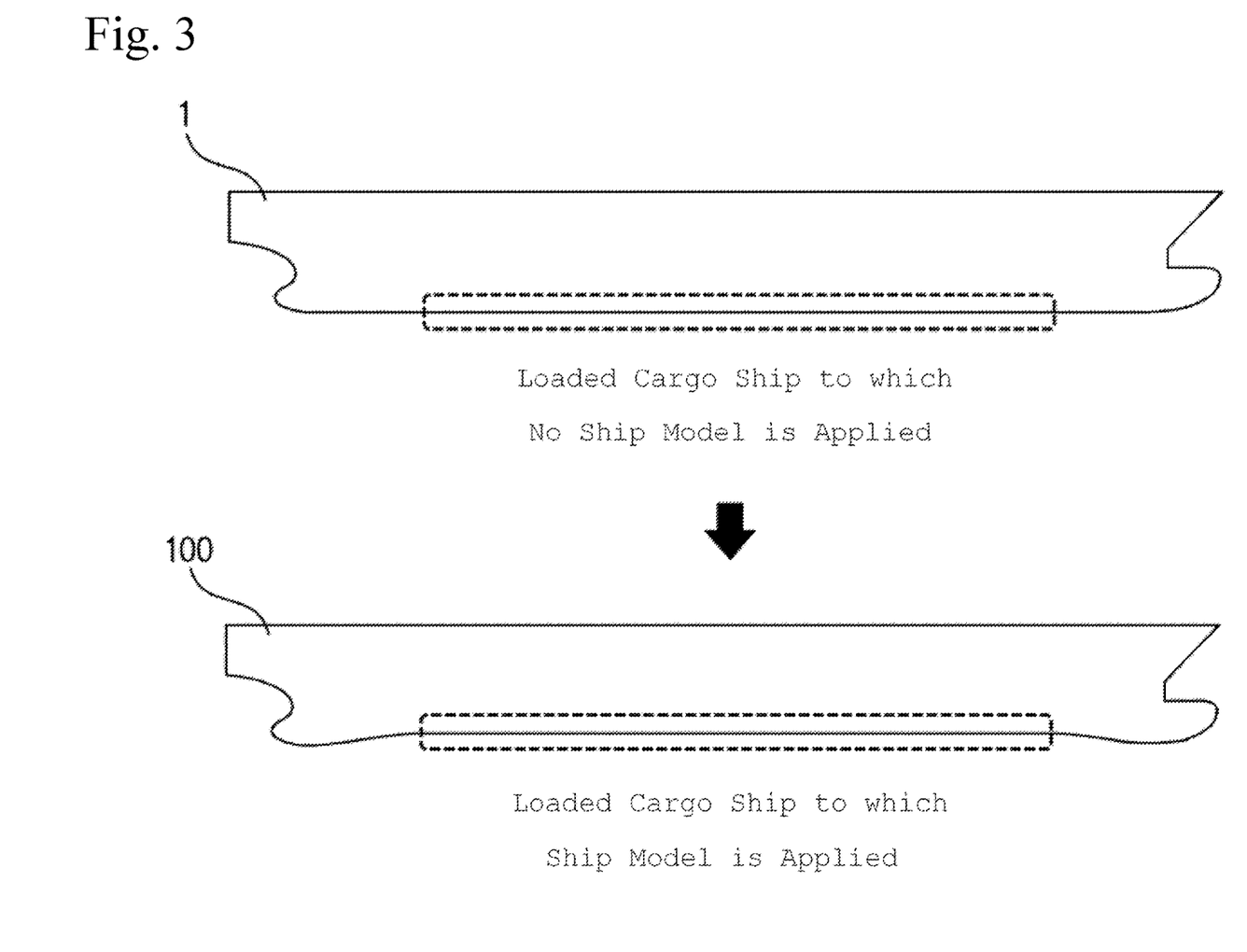
FIG. 3 is a view comparing the bottom shell plate of a typical ballast water ship 1 and the bottom shell plate of the ballast water-free ship 100 according to an embodiment of the present invention.

FIG. 2 is a schematic view illustrating a bottom shell plate of a ballast water-free ship 100 using a difference in the depth of the bottom shell plate between the bow/stern and the midship section according to an embodiment of the present invention, and FIG. 3 is a view comparing the bottom shell plate of a typical ballast water ship 1 and the bottom shell plate of the ballast water-free ship 100 according to an embodiment of the present invention.

Referring to FIGS. 2 and 3, the ballast water-free ship 100 using a difference in the depth of the bottom shell plate between the bow/stern and the midship section according to an embodiment of the present invention may generally include the bow 110, the stern 120, a cargo containment 130, and a bilge keel 140. According to a further embodiment, one or more fin stabilizers 150 may be provided on the bottom shell plate.

Here, the bow 110 and the stern 120 are provided on lower portions of the front section and the rear section of the ballast water-free ship 100. The bow 110 and the stern 120 may protrude downward with respect to the bottom shell plate of the cargo containment 130 located in the midship section.

The bottom shell plates of the bow 110 and the stern 120 are provided to be lower in the downward direction than the bottom shell plate of the cargo containment 130, thereby forming stepped portions SP1 and SP2. The stepped portions SP1 and SP2 cause a difference in the height $\Delta H_1$ or $\Delta H_2$ between either the draft DR1 of the bow 110 or the draft DR3 of the stern 120 and the draft of DR2 the cargo containment 130.

That is, since the bulb of the bow 110 is located lower than the midship section, it is possible to provide a countermeasure to bow slamming during voyage of the ballast water-free ship 100. In addition, a propulsion system is located in the stern 120. Since the stern 120 is located to be lower than the midship section, a proper immersion depth for the propeller can be obtained.

In addition, since the height of the bottom shell plate of either the bow 110 or the stern 120 differs from the height of the bottom shell plate of the containment 130 in the midship section, an increase in resistance is offset by a decrease in the wetted surface area of the midship section. It is therefore possible to achieve an appropriate level of resistance propulsion performance.

In addition, the height of the bottom shell of the cargo containment 130 is changed to reduce the draft, thereby reducing the wetted surface area of the hull. When cargo is loaded, an increase in resistance performance is relatively small. Accordingly, when the weight of cargo is similar to that loaded on a conventional ballast water ship, the ballast water-free ship according to the invention can be operated by consuming an amount of fuel similar to the conventional ballast water ship.

The ballast water-free ship 100 using a difference in the depth of the bottom shell plate between the bow/stern and the midship section according to an embodiment of the present invention may be configured to use clean water (e.g. drinking water, extinguishing water, or the like), operated in the ship, as ballast water when loading and unloading cargo. In this case, a technology of introducing the clean water operated in the ship into the ballast tank, instead of generally taking sea water from the outside into the ballast tank in the hull, may be used. In addition, the clean water, after having been used as ballast water, may be re-used in the ship after a cleaning process or a plurality of filtering processes.

Referring to FIG. 3, the upper figure illustrates a bottom shell plate of a typical ballast water ship 1. It can be appreciated that the bottom shell plate of the ballast water ship 1 is planar compared to the bottom shell plate of the ballast water-free ship 100 according to the present invention.

In contrast, it can be appreciated that, in the ballast water-free ship 100 according to the present invention, illustrated in the lower figure, the bottom shell plate of either the bow 110 or the stern 120 is lower downward than the bottom shell plate of the midship section.

Figure 4:
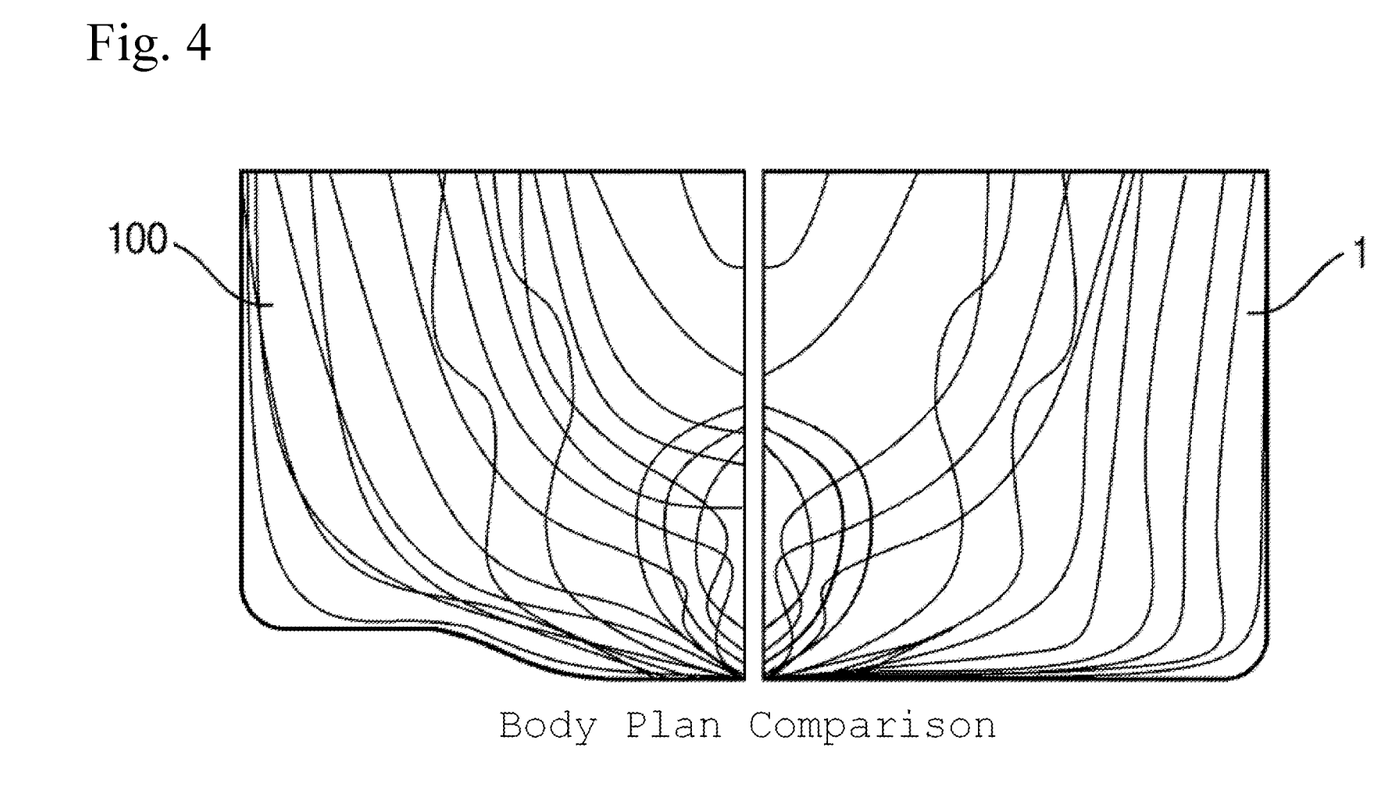
FIG. 4 is a view comparing a body plan of a ship model of the ballast water-free ship 100 using a difference in the depth of the bottom shell plate between the bow/stern and the midship section according to an embodiment of the present invention with a body plane of a related-art ship model.

FIG. 4 is a view comparing a body plan of a ship model of the ballast water-free ship 100 using a difference in the depth of the bottom shell plate between the bow/stern and the midship section according to an embodiment of the present invention with a body plane of a related-art ship model.

Referring to FIG. 4, the left part of FIG. 4 is a view illustrating the body plan to which the ship model of the ballast water-free ship 100 according to the present invention is applied, while the right part of FIG. 4 is a view illustrating the body plan to which the ship model of the ballast water ship 1 of the related art is applied.

Compared to a non-ballast water ship (NOBS) or minimal ballast water ship (MIBS) technology intended to provide a non-ballast water structure to the conventional ballast water ship 1 illustrated on the right, the vertical degree of the topside of the ship can be maintained, none of attachments, equipment, and instruments is required on the outer portion of the ship. Accordingly, a super-sized fender is not required in the process of docking the ship to the inner wall, and operability in conventional ports can advantageously be obtained.

Figure 5:
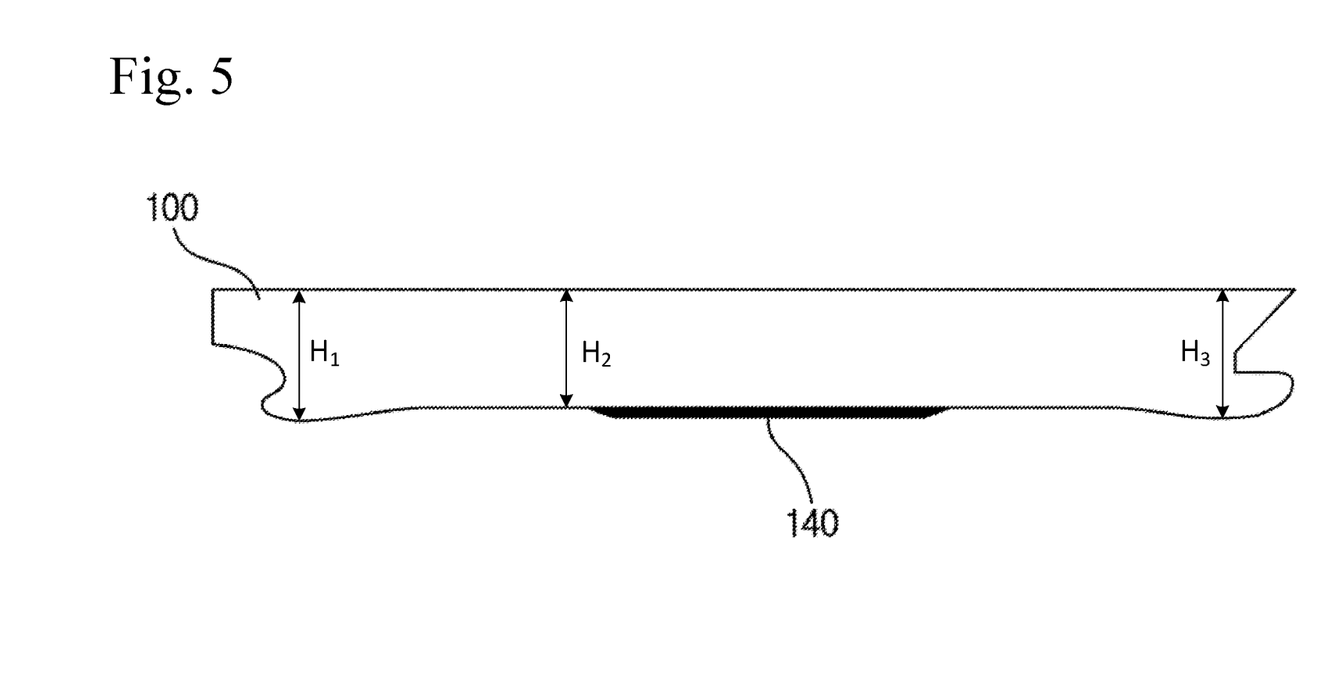
FIG. 5 is a schematic view illustrating the ballast water-free ship 100 using a difference $H_1$-$H_2$ or $H_3$-$H_2$ in the depth of the bottom shell plate between the bow/stern and the midship section according to an embodiment of the present invention, with a bilge keel 140 being disposed on the bottom shell plate.
Figure 6:
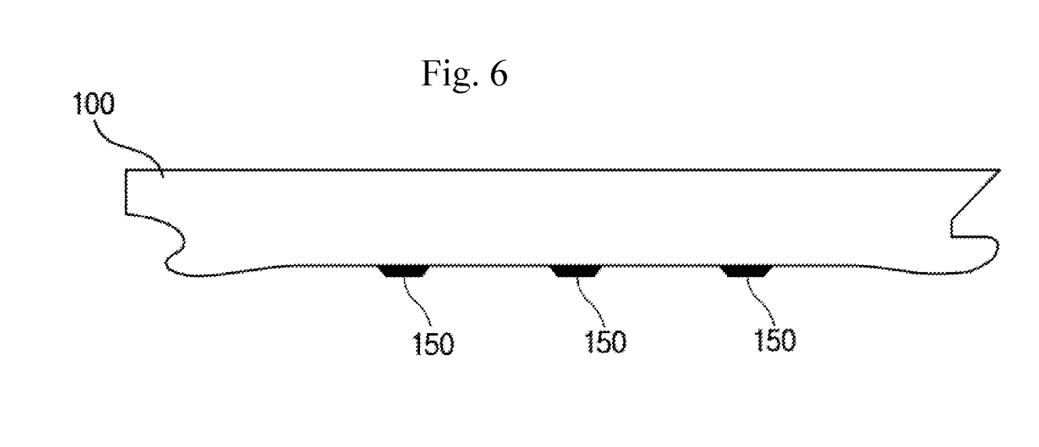
FIG. 6 is a schematic view illustrating the ballast water-free ship 100 using a difference in the depth of the bottom shell plate between the bow/stern and the midship section according to an embodiment of the present invention, with one or more fin stabilizers 150 being disposed on the bottom shell plate.

FIG. 5 is a schematic view illustrating the ballast water-free ship 100 using a difference $H_1$-$H_2$ or $H_3$-$H_2$ in the depth of the bottom shell plate between the bow/stern and the midship section according to an embodiment of the present invention, with a bilge keel 140 being disposed on the bottom shell plate, FIG. 6 is a schematic view illustrating the ballast water-free ship 100 using a difference in the depth of the bottom shell plate between the bow/stern and the midship section according to an embodiment of the present invention, with one or more fin stabilizers 150 being disposed on the bottom shell plate.

Referring to FIGS. 5 and 6, the bilge keel 140 or the fin stabilizers 150 may be applied to the bottom of the ballast water-free ship 100 according to an embodiment of the present invention, for the purpose of posture control and structural strength reinforcement. More particularly, the bilge keel 140 or the fin stabilizers 150 may be applied to the bottom shell plate in the base line of the bow 110 and the stern 120 below the cargo containment 130.

During cargo loading at a port, unbalanced cargo weight may cause a problem involved in posture control, such as trim or heel control. Clean water (drinking water or extinguishing water), which is not discharged from the ship, may be limitedly used for the purpose of solving this problem. To cope with load, such as hogging or sagging, from which the ship continuously suffers in the sea, the construction of the bilge keel of the midship section is reflected in the aspect of improvement in longitudinal strength. Accordingly, a countermeasure to load that the hull of the ballast water-free ship 100 supports during voyage can be obtained.

In particular, the bilge keel 140 according to an embodiment may be disposed in the longitudinal direction of the bottom shell plate of the ballast water-free ship 100, and one or more fin stabilizers 150 may be arranged in the longitudinal direction of the bottom shell plate.

Figure 7:
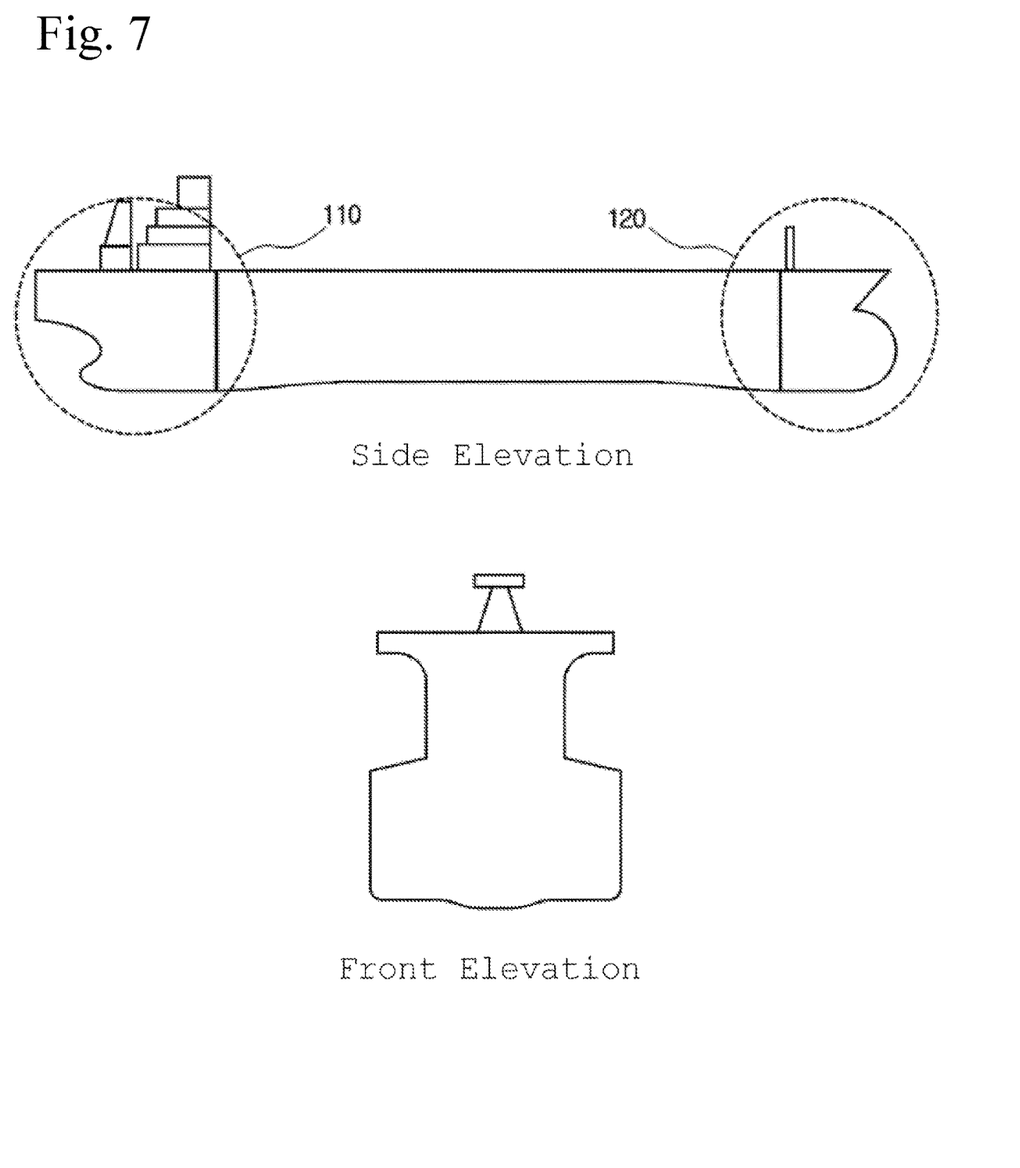
FIG. 7 is a schematic view illustrating front and side profiles of a 176K-class bulk carrier to which the ship model of the ballast water-free ship 100 using a difference in the depth of the bottom shell plate between the bow/stern and the midship section according to an embodiment of the present invention is applied.

FIG. 7 is a schematic view illustrating front and side profiles of a 176K-class bulk carrier to which the ship model of the ballast water-free ship 100 using a difference in the depth of the bottom shell plate between the bow/stern and the midship section according to an embodiment of the present invention is applied.

Referring to FIG. 7, when the ship model of the ballast water-free ship 100 according to the present invention is applied to the 176K-class bulk carrier, the bottom shell plate of the engine room in the stern is provided to be lower than the cargo containment in order to obtain the propeller immersion depth. The bulb of the bow is provided to be lower than the bottom shell plate of the cargo containment to be prepared for bow slamming.

Figure 8:
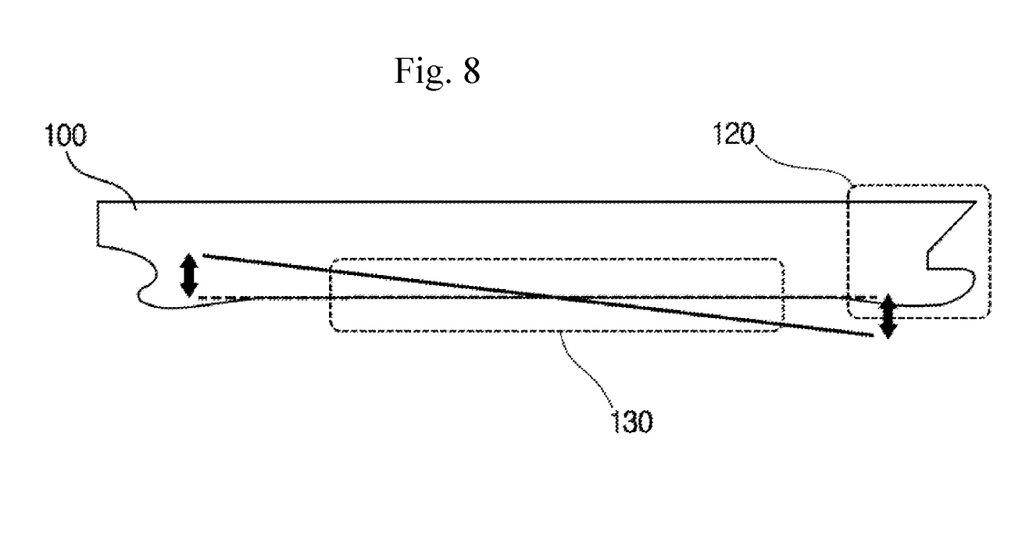
FIG. 8 is a schematic view illustrating the ballast water-free ship 100 using a difference in the depth of the bottom shell plate between the bow/stern and the midship section according to an embodiment of the present invention, in which an incline is formed on the surface of the bottom of the cargo containment 130 located in the midship section.

FIG. 8 is a schematic view illustrating the ballast water-free ship 100 using a difference in the depth of the bottom shell plate between the bow/stern and the midship section according to an embodiment of the present invention, in which an incline is formed on the surface of the bottom of the cargo containment 130 located in the midship section.

Referring to FIG. 8, the surface of the bottom of the cargo containment 130 may be designed and constructed at an inclination in the direction of the stern 120 as a preparation for the occurrence of a longitudinal incline due to unbalanced cargo weight in the ballast water-free ship 100, the weight of an engine section, or the like.

Figure 9:
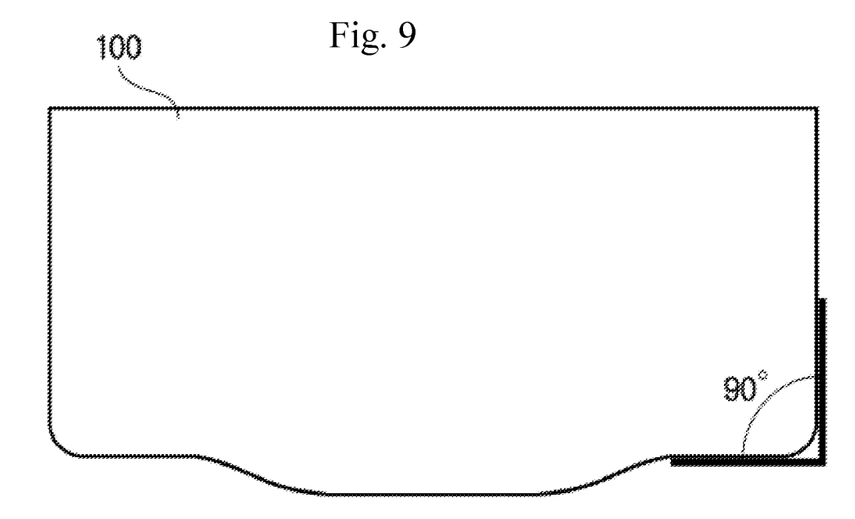
FIG. 9 is a schematic view illustrating the ballast water-free ship 100 using a difference in the depth of the bottom shell plate between the bow/stern and the midship section according to an embodiment of the present invention, in which the hull bilge radius (or curvature) is formed at an angle equal to 90°.

Referring to FIG. 9, in the ballast water-free ship 100 according to an embodiment of the present invention, the hull bilge radius is formed so as to make an angle between a side and a bottom of the bottom shell plate equal to 90°, while the NOBS or MIBS of the related art is V-shaped.

Referring to FIG. 9, in the ballast water-free ship 100 according to an embodiment of the present invention, the hull bilge radius corresponds to an angle 90°, while the NOBS or MIBS of the related art is V-shaped.

In this case, the planar section of the bottom shell plate is maximized. Accordingly, some problem, such as a variation in either the trim or the heel or degraded roll-damping ability during voyage, due to cargo loading, can be overcome.

A method of constructing a ballast water-free ship using a difference in the depth of the bottom shell plate between the bow/stern and the midship section according to another embodiment of the present invention may include step S101 of providing the bow 110 and the stern 120 to protrude downward, thereby forming stepped portions with respect to the bottom shell plate in the midship section of the water-free ship 100, and step S102 of locating the bilge keel 140 or the fin stabilizers 150 on the bottom of the midship section, the bottom shell plate, for the purpose of structural strength reinforcement and posture control.

In addition, the method may further include step S103 of forming the cargo containment 130 located in the midship section of the ballast water-free ship 100, such that the bottom surface of the cargo containment 130 is inclined toward the stern, and step S104 of forming the hull bilge radius of the bottom shell plate at an angle 90°.

As set forth above, in the ballast water-free ship 100 using a difference in the depth of the bottom shell plate between the bow/stern and the midship section according to the present invention, the height of the bottom shell plate in either the bow or the stern is provided different from the height of the bottom shell plate in the cargo containment. Accordingly, it is possible to 1) obtain posture control performance in the case of cargo loading, 2) obtain a proper immersion depth for the propeller, 3) obtain an appropriate level of resistance propulsion performance, and 4) impart the bulb of the bow with a lower draft than the cargo containment so as to be immersed more deeply, thereby providing a countermeasure to bow slamming during voyage.

In addition, due to the bilge keel or the fin stabilizers applicable to the bottom shell plate, 5) a countermeasure to bow slamming during voyage can be provided, 6) the vertical degree of the topside of the ship can be maintained without operation of additional external attachments, equipment, and instruments, thereby obtaining operability in conventional ports, 7) the ship can be constructed using docks or construction equipment of conventional shipyards, with the necessity of addition or operation of additional equipment and facilities being removed, so that easy technical implementation can be obtained, and 8) since a length of time, e.g. several days, in which a ship must stand by at a port for ballast water certification can be reduced, the ship operating rate can be improved, thereby realizing life cycle economic efficiency.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

INDUSTRIAL APPLICABILITY

According to the present invention, a ship can load or unload cargo or sail without ballast water operation. The present invention is a technology to be widely used in the shipbuilding and marine industry, so that the practical and economic values thereof can be realized.

The invention claimed is:

1. A ballast water-free ship comprising:
a bulbous bow and a bulbous stern each protruding downward to form a stepped portion in a bottom shell plate of a ship, between either the bow or the stern and a midship section;
a bilge keel provided on a bottom of the bottom shell plate in the midship section and disposed in a longitudinal direction of the bottom shell plate; and
three fin stabilizers disposed on the bottom of the bottom shell plate in the midship section and between the bulbous bow and the bulbous stern, the three fin stabilizers being arranged in the longitudinal direction of the bottom shell plate,
wherein a bottom surface of a cargo containment located in the midship section of the ship has an inclination in a direction of the stern,
wherein the ship is configured to use clean water including drinking water or extinguishing water as ballast water during cargo loading or unloading,
wherein the stepped portion formed on the bottom shell plate, between either the bow or the stern and the midship section, causes a difference in height between a draft of the midship section and a draft of either the bow or the stern, such that posture control of the ship in a body of water is enabled in a ballast water-free condition, using a difference in depth of the bottom shell plate between either the bow or the stern and the midship section, and
wherein a hull bilge radius of the bottom shell plate is formed so as to make an angle between a side and a bottom of the bottom shell plate equal to 90°.

2. The ballast water-free ship according to claim 1, wherein, after the clean water has been used as the ballast water, the ship is further configured to perform a cleaning process or a plurality of filtering processes on the clean water to re-use in the ship.

3. A method of constructing a ballast water-free ship, comprising:
providing a bulbous bow and a bulbous stern, each of the bulbous bow and the bulbous stern protruding downward to form a stepped portion in a bottom shell plate of a ship, between either the bow or the stern and a midship section;
providing a bilge keel on a bottom of the bottom shell plate in the midship section and in a longitudinal direction of the bottom shell plate;
providing three fin stabilizers on the bottom of the bottom shell plate in the midship section and between the bulbous bow and the bulbous stern and arranging the three fin stabilizers in the longitudinal direction of the bottom shell plate;
forming a bottom surface of a cargo containment, located in the midship section of the ship, to have an inclination in a direction of the stern; and
forming a hull bilge radius of the bottom shell plate so as to make an angle between a side and a bottom of the bottom shell plate equal to 90°,
wherein the stepped portion formed on the bottom shell plate, between either the bow or the stern and the midship section, causes a difference in height between a draft of the midship section and a draft of either the bow or the stern, such that posture control of the ship in a body of water is enabled in a ballast water-free condition, using a difference in depth of the bottom shell plate between either the bow or the stern and the midship section.

\* \* \* \* \*